Figure 1:
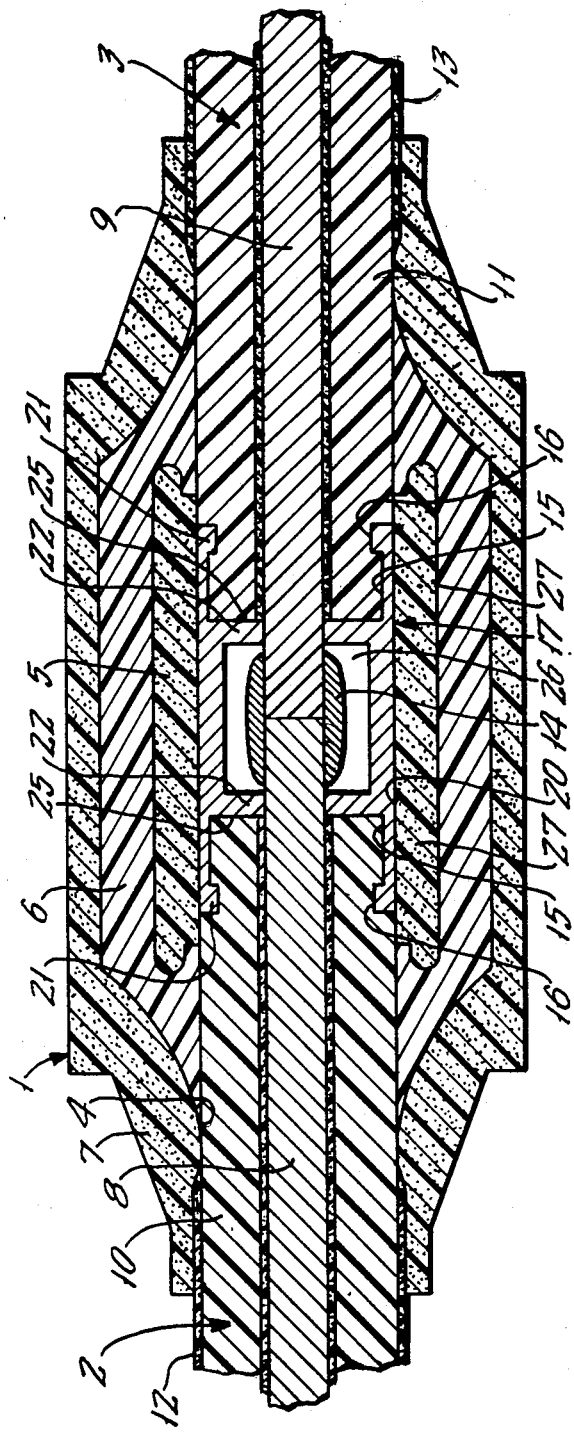

United States Patent [19]

Parmigiani et al.

[11] Patent Number: 4,698,458

[45] Date of Patent: Oct. 6, 1987

[54] JOINT FOR CABLES WITH AN EXTRUDED INSULATION

[75] Inventors: Bruno Parmigiani; Gianmario Lanfranconi, both of Milan, Italy

[73] Assignee: Societa' Cavi Pirelli S.p.A., Milan, Italy

[21] Appl. No.: 860,319

[22] PCT Filed: Sep. 26, 1985

[86] PCT No.: PCT/EP85/00500

§ 371 Date: Apr. 15, 1986

§ 102(e) Date: Apr. 15, 1986

[87] PCT Pub. No.: WO86/02210

PCT Pub. Date: Apr. 10, 1986

[30] Foreign Application Priority Data

Sep. 28, 1984 [IT] Italy .......................................... 22912

[51] Int. Cl.$^4$ ................... H02G 15/184; H02G 15/103
[52] U.S. Cl. ................................. 174/73 R; 174/88 C
[58] Field of Search ............... 174/73 R, 73 SC, 88 R, 174/88 C, 92

[56] References Cited

U.S. PATENT DOCUMENTS 3,804,972  4/1974  Gommans et al. ................ 174/88 C
4,034,151  7/1977  Silva et al. ......................... 174/73 R

FOREIGN PATENT DOCUMENTS 3142191  5/1983  Fed. Rep. of Germany .... 174/73 R
54-49588  4/1979  Japan .................................. 174/73 R Primary Examiner—Laramie E. Askin
Attorney, Agent, or Firm—Brooks Haidt Haffner & Delahunty

[57] ABSTRACT

A joint structure for interconnecting a pair of electrical cables each having a conductor surrounded by insulation which is surrounded by a layer of semi-conductive material. The mechanically interconnected conductor ends are surrounded by a two-part metal adaptor which has annular ribs at its ends which fit into annular grooves in the insulation of the cables. The adaptor is covered throughout its length with an electrical field modifier which is embedded in insulation covered by a layer of semi-conductive material which interconnects the semi-conductive layers of the cables.

4 Claims, 2 Drawing Figures

JOINT FOR CABLES WITH AN EXTRUDED INSULATION

The present invention relates to a joint for cables having an extruded insulation and provided with a sleeve, and in particular, a sleeve of the monolithic type which is fitted upon and tightened over the joined ends of the cables.

The known joints of such type have the following structure.

At the extremities of the cables, the extruded insulation and the outer semiconductive screens are stripped, in a staggered manner from the conductors.

The conductors, disposed end-to-end, are joined together, for example, through welding, or by means of a compression clamp or the like, and over the joining zone of the conductors, there is disposed a metallic adaptor.

The metallic adaptor is a cylindrical body, having its outer diameter equal to the outer diameter of the insulation of the cables.

The ends of the adaptor are in contact with the insulation of the cables, and the adaptor is provided with an inner cavity inside which the fastening between the conductors is enclosed.

A sleeve of the monolithic type, i.e. a sleeve comprising at least one insulating layer and a semiconductive field modifier which is embedded into the insulating layer and faces the sleeve cavity, is fitted upon and tightened over the joined ends of the cables.

If each cable has a semiconductive layer on its outer surface, then even the monolithic sleeve will have a semiconductive layer on its outer surface. The configuration of the monolithic sleeve is such as to bring the outer, semiconductive layer of the sleeve into contact with the outer, semiconductive layers of the two cables.

The known joints described above has been found to be relatively satisfactory for the connections of medium voltage cables and low voltage cables. However, although proposed, they have not, up to now, found any practical application in instances of high voltage cables.

The reason for this is that at high voltages the joints of the type under consideration are inevitably subject to being perforated after they have been made to operate for a certain amount of time.

It has been noted that what causes these perforations is the infiltration of air and the origination of small interspaces which, with the passage of time, become formed between the surface of insulating material of the monolithic sleeve cavity and the outer surface of the insulation of the cables.

Such infiltration of air, as well as the formation of the above-mentioned interspaces, takes place mainly due to the reasons set forth hereinafter.

The cables with extruded insulation are manufactured by means of a continuous extrusion of the semiconductive layers and of the insulating layer around a conductor.

The extruding operation is followed by the cross-linking of the extruded material and, successive to this, an immediate cooling of the cable is carried out.

Owing to the above-described operations, inside the extruded materials of the cables, and particularly, in the extruded insulation of the cables, internal tensions arise, both longitudinally as well as circumferentially, and are caused by the difference between the thermal expansibility of the metallic material of the conductors and that of the extruded cross-linked materials.

As a matter of fact, the thermal expansion coefficient of any metallic material (which, as an example, is $24 \times 10^{-6}$ for aluminum) is less than the thermal expansion coefficient of any plastic material (which, as an example, is $5 \times 10^{-2}$ for a cross-linked polyethylene) out of which the insulation of the cable is formed.

This difference between the thermal expansion coefficient allows for a greater shrinking to be expected on the part of the insulating material following a sudden cooling which the cable undergoes after its vulcanization as compared to the shrinking of the conductor.

However, since there exists a close contact between the conductor and the insulation of a cable, the friction between these is so high that the maximum shrinking possible for the insulating material of the cable is limited to that of the conductor.

As a consequence of this, internal tensions arise inside the insulation of the cables.

In the joint zone, at each of the ends of the cables, there is no continuity of the insulation, and hence, the tensions which exist there are free to act and to cause longitudinal shrinkings with the passage of time and under the action of the thermal cycles which occur when the joint is in use.

Such shrinkings cause detaching of the ends of the insulations of the cables from the ends of the metallic adaptor of the joint.

Moreover, at the joint, the monolithic sleeve causes a compressive action upon the insulations of the cables.

This compressive action, in the presence of detaching of the insulations of the cable from the ends of the metallic adaptor and with the passing of time, causes a deformation of the insulations and a shifting of the material of the insulations toward the space which is created by such detaching.

This movement of material causes a reduction in the pressure which is applied by the sleeve upon the outer cylindrical surface of the cable which lessens the dielectric rigidity of the sleeve-cable interface. Moreover, air and/or water infiltration inbetween the sleeve and the ends of the cables and the formation of small voids at the interface between the sleeve and the cables can occur.

Owing to this, the perforations occurring in joints, which are unavoidable in high voltage cables owing to the high electrical tensions existing, are also possible in the joints of medium and low voltage cables.

One aim of the present invention is to improve the reliability of the joints used for the low and medium voltage cables, and moreover, to render application of such joints possible in the case of high voltage cables.

What forms one object of the present invention is a joint for extruded insulation cables, such joint being of the type comprising a monolithic sleeve provided with a semiconductive electric field modifier facing its own through-cavity and fitted and tightened on the ends of the insulations of the ends of the cables and of a metallic adaptor interposed between such ends, said sleeve circumscribing the end-to-end connection of the conductors of the cables and such joint being characterized by the fact that mechanical anchorings, underlying and entirely in contact with the field modifier of the sleeve, secure the metallic adaptor to the insulations of the cables.

Figure 2:
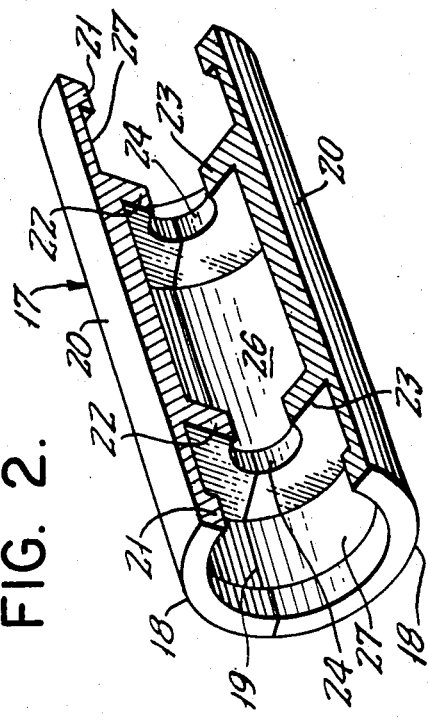

The present invention will be better understood from the following detailed description, made solely by way of a non-limiting example and referring to the attached drawings, wherein:

FIG. 1 is a longitudinal cross-section of a joint according to the invention; and FIG. 2 is a perspective view, partially in section, of the adaptor forming part of the joint shown in FIG. 1.

As can be seen in FIG. 1, the joint includes a monolithic sleeve 1 of a known type, which is fitted over and tightened upon the ends of two cables 2 and 3 which are connected together.

The monolithic sleeve 1 has a through-cavity 4 in the central position of which there is a semiconductive electric field modifier 5.

The modifier 5 is embedded in an insulating layer 6 which is covered externally with a layer 7 of semiconductive material which forms the extremities of the sleeve 1 and by which the sleeve 1 contacts the external semiconductive layers 12 and 13 of the cables 2 and 3.

The extremities of the cables 2 and 3, connected together in the joint, have terminal tracts of conductors 8 and 9 from which the insulations 10 and 11 and the outer semiconductive layers 12 and 13 are stripped in a staggered way.

The conductors 8 and 9 of the cables 2 and 3 are placed in end-to-end contact and are interconnected by a mechanical connection, for example, by a weldment 14 or, as an alternative, by a clamp or ferrule or the like.

In general, the mechanical connection between the conductors 8 and 9 is enclosed in the cavity of a metallic adaptor, and mechanical anchoring means secures the adaptor to the insulations 10 and 11 of the cables.

Said mechanical anchoring means generally comprises at least one mechanically resistant element extending from the end of the adaptor in its axial direction and embedded in the outer surface of the insulations of the cables, and said mechanically resistant element is provided with at least one rib which is insertable into a hollow of a complementary form in said insulations of said cables.

Moreover, the dimensions, in the longitudinal direction, of the joint of the mechanical anchoring means must be such that such means entirely underlies and is in contact with the semiconductive material of the modifier 5 which surrounds the through-cavity 4 of the sleeve 1.

The mechanically resistant element can be formed so as to form a single body with the adaptor or, alternatively, be separate from but connected or connectable to it.

The mechanically resistant element can assume various configurations for carrying out the function of being anchored to the insulations of the cables, and the end tracts of said insulations of the cables have configurations depending upon those of the mechanically resistant element.

In the embodiment shown in the drawing, there is utilized a particular metal adaptor and mechanically resistant element assembly, and the outer surfaces of the end portions of the insulations 10 and 11 of the cables each has a reduced diameter portion 15 adjacent to which there is an annular hollow or groove 16.

As can be seen in the drawing, and particularly in FIG. 2, said "assembly" is constituted by a tubular cylinder 17 which is formed by two hollow semicylinders 18 which are joinable to one another along surfaces 19 upon which they are fixed by known means (not shown).

Each hollow semicylinder 18 has a smooth outer surface 20 which is aligned with the outer surfaces of the insulations 10 and 11 of the cables.

The inner surface of each hollow semicylinder 18 is shaped so as to provide the following elements.

In correspondence of the extremities, there are provided semiannular ribs 21 having a form which is complementary to that of the grooves 16 in the insulations 10 and 11 of the cables.

Moreover, there are also present two semicylindrical, inwardly extending ribs 22 having flat ends at the central portions of their surfaces 23 and having semi-circular apertures 24, which ribs provide, after the semicylinders 18 are assembled together, a pair of walls with through openings having diametral dimensions equal to the outer dimensions of the conductors 8 and 9 of the cables.

The distance between the non-facing surfaces of the semicylindrical ribs 22 is equal to the distance between the facing surfaces 25 of the insulations 10 and 11 of the two cables. In this manner, the central tract of the cylindrical body 17 carries out the functions of the adaptor, and the semicylindrical ribs 22 are in contact with the insulations 10 and 11 of the cables and the weldment 14 is in a cavity 26 between them.

Instead of the prior art mechanically resistant elements, the end portions 27 of the semicylinders 18 constitute the mechanically resistant elements, and they are embedded in the outer surface of the insulations 10 and 11 of the cables and fill the spaces between the smaller diameter portions 15 and the modifier 5. Moreover, their ribs 21 are inserted into the annular grooves 16 of the insulations of the cables.

Moreover, the dimension, in the longitudinal direction of the joint, of the end portions 27 of he semicylinders 18, which constitute the mechanically resistant elements through which the anchoring of the insulations of the cables to the metal adaptor is realized, are such as to allow them to be in contact with and underlie the modifier 5 of the monolithic sleeve 1.

From the previously given description of an embodiment of a joint according to the invention, as well as from the considerations set forth hereinafter, it can be understood how the proposed aims of the invention have been achieved by such joint.

The presence in a joint according to the invention of mechanical anchorings between the insulations of the cables and the adaptor provides a mechanical continuity between these elements.

This mechanical continuity, in preventing any shrinking from occurring in the insulations at the ends of the cables, obviates the previously described phenomenon connected with such shrinkings and, hence, also the drawbacks which result.

As a consequence, not only has it been rendered possible to now realize joints for high voltage cables, but also to increase the reliability of the joints used for medium and low voltage cables.

Although there has been illustrated and described herein a particular embodiment for a joint according to the present invention, what is also intended as being comprised within the scope of this invention are all those possible alternative embodiments which are apparent to one skilled in the art from the description herein of a preferred embodiment.

We claim:

1. A joint between a pair of cables, each cable having a conductor surrounded by extruded insulation, said joint comprising:

> end portions of said cables with portions of said extruded insulation removed adjacent the ends of said cables to provide bare conductor portions extending from exposed ends of the remaining said extruded insulation;
>
> conductive means mechanically and electrically interconnecting said bare conductor portions and disposed intermediate said exposed ends of said extruded insulation, said conductive means having an exterior size smaller than the exterior size of said extruded insulation;
>
> a tubular metal adaptor disposed around said conductive means and having a pair of spaced walls extending from said tubular metal adaptor toward and transversely to said conductor portions, one of said walls abutting one of said exposed ends of said extruded insulation and the other of said walls abutting the other of said exposed ends of said extruded insulation, each said cable having an annular groove in said extruded insulation thereof adjacent but spaced from its exposed end and said tubular metal adaptor having insulation engaging ribs at axially opposite ends thereof, one of said insulation engaging ribs at one of said ends of said tubular metal adaptor extending into said groove of the extruded insulation of the cable adjacent thereto and the other of said insulation engaging ribs at the other end of said tubular metal adaptor extending into said groove of the extruded insulation of the other cable adjacent thereto for preventing movement of said exposed ends away from said walls; and
>
> a monolithic sleeve of insulation having a conductive electrical field modifier at the inner surface thereof and which extends circumferentially of said inner surface and has an exposed inner surface, said modifier having an axial length at least equal to the axial length of said tubular metal adaptor and said monolithic sleeve being disposed with said modifier in contact with and surrounding said tubular metal adaptor, with one of its ends surrounding and engaging said extruded insulation of one of said cables and with the other of its ends surrounding and engaging said extruded insulation of the other of said cables.

2. A joint as set forth in claim 1 wherein each of said walls in in conductive contact respectively with the conductors of said cables.

3. A joint as set forth in claim 1 wherein the outer diameter of said tubular metal adaptor is substantially equal to the outer diameters of the said extruded insulation of said cables.

4. A joint as set forth in claim 1 wherein said tubular metal adaptor is a hollow cylindrical body formed by two hollow, semicylindrical bodies, each of said bodies having first spaced semi-annular ribs, each latter rib respectively forming one-half of one of said walls, and second spaced semi-annular ribs, each of said second semi-annular ribs respectively forming one-half of said insulation engaging ribs.

* * * * *